(12) United States Patent
Prenzler

(10) Patent No.: US 9,567,733 B2
(45) Date of Patent: Feb. 14, 2017

(54) DEVICE FOR LIMITING THE FLOW OF A FLUID, IN PARTICULAR THE FLOW OF WATER IN A SHOWER

(71) Applicant: Klaus Prenzler, Wietze (DE)

(72) Inventor: Klaus Prenzler, Wietze (DE)

(*) Notice: Subject to any disclaimer, the term of this patent is extended or adjusted under 35 U.S.C. 154(b) by 0 days.

(21) Appl. No.: 15/030,939

(22) PCT Filed: Oct. 9, 2014

(86) PCT No.: PCT/EP2014/071640
§ 371 (c)(1),
(2) Date: Apr. 21, 2016

(87) PCT Pub. No.: WO2015/058965
PCT Pub. Date: Apr. 30, 2015

(65) Prior Publication Data
US 2016/0265199 A1 Sep. 15, 2016

(30) Foreign Application Priority Data
Oct. 21, 2013 (DE) .................... 20 2013 104 717 U

(51) Int. Cl.
| G05D 7/01 | (2006.01) |
| E03C 1/08 | (2006.01) |
| E03C 1/02 | (2006.01) |
| F16L 55/027 | (2006.01) |
| B01F 5/04 | (2006.01) |

(52) U.S. Cl.
CPC .............. *E03C 1/025* (2013.01); *B01F 5/0428* (2013.01); *F16L 55/027* (2013.01); *E03C 2001/026* (2013.01)

(58) Field of Classification Search
CPC ............ E03C 1/025; E03C 1/08; E03C 1/084; E03C 2001/026; B01F 5/0428; F16L 55/027
USPC ... 138/42, 45, 46; 239/428.5, 430, 538, 539, 239/540, 590.5
See application file for complete search history.

(56) References Cited

U.S. PATENT DOCUMENTS

| 4,181,987 A * | 1/1980 | Kesselman ............. F16K 19/00 137/606 |
| 5,348,231 A * | 9/1994 | Arnold .................... E03C 1/084 239/428.5 |
| 5,934,330 A | 8/1999 | Prenzler |

(Continued)

FOREIGN PATENT DOCUMENTS

| DE | 102008050247 A1 | 3/2010 |
| EP | 0693970 B1 | 11/1999 |

(Continued)

*Primary Examiner* — Patrick F Brinson
(74) *Attorney, Agent, or Firm* — Lucas & Mercanti, LLP; Klaus P. Stoffel

(57) ABSTRACT

A device for restricting flow of a fluid, in particular the flow of water in a sanitary fitting, includes a substantially cylindrical, hollow inlet body for the fluid, and a substantially cylindrical outlet body for the fluid, which is connected to the inlet body so as to be rotatable about a common longitudinal axis, and conducts the fluid via a cross borehole and a following cavity in the direction of the longitudinal axis. A mixing chamber includes a lateral intake borehole from which a further fluid can be supplied from outside the outlet body A clamping device fixes the set radial position of the inlet body and the outlet body relative to each other.

12 Claims, 3 Drawing Sheets

(56) References Cited

U.S. PATENT DOCUMENTS

| | | | | |
|---|---|---|---|---|
| 6,513,731 | B2* | 2/2003 | Griffin | E03C 1/084 |
| | | | | 239/394 |
| 6,708,902 | B2* | 3/2004 | Takeshi | E03C 1/084 |
| | | | | 239/428.5 |
| 8,245,721 | B2* | 8/2012 | Kuo | E03B 7/10 |
| | | | | 137/217 |
| 8,800,892 | B2 | 8/2014 | Prenzler | |
| 2015/0308591 | A1* | 10/2015 | Davino | E03C 1/025 |
| | | | | 285/92 |

FOREIGN PATENT DOCUMENTS

| | | | |
|---|---|---|---|
| EP | 2331755 | B1 | 11/2012 |
| WO | 2006005099 | A2 | 1/2006 |

\* cited by examiner

DEVICE FOR LIMITING THE FLOW OF A FLUID, IN PARTICULAR THE FLOW OF WATER IN A SHOWER

The present application is a 371 of International application PCT/EP2014/071640, filed Oct. 9, 2014, which claims priority of DE 20 2013 104 717.1, filed Oct. 21, 2013, the priority of these applications is hereby claimed and these applications are incorporated herein by reference.

BACKGROUND OF THE INVENTION

The present invention relates to a device for restricting the flow of, for example, water in a sanitary fitting. A device of this type is, for example, used as a shower valve between a connecting pipe and a shower to restrict water flow and to save water.

From EP 0 693 970 B1 by the same applicant, there is known a water jet regulating device and flow restrictor for sanitary fittings. The throttling element described therein comprises a throttling plate having a water inlet borehole, the diameter thereof being adjusted in accordance with the desired flow restriction. For fine adjustment of the flow, a throttling screw including a valve tip projects into the inlet borehole. Precise flow adjustment can be accomplished via rotating said throttling screw. This known water jet regulating device has been proven practical has widely been used, in particular with sanitary taps. For realizing a wide range of flow restriction, the throttling plate having the inlet borehole may be replaced by another plate having a different borehole diameter. When manufacturers or users store a supply of different throttling plates, a wide range of applications in different fields can be covered.

Further, from EP 2 331 755 B1 by the same applicant, there is known a regulating device comprising a cylindrical throttling element. This cylindrical throttling element deflects the incoming water jet, guiding it into a mixing chamber where mixing with air can take place. In addition, fine adjustment of regulation of the water jet is accomplished by means of a regulating screw. Air admixture is adjustable and, in one setting, can be completely turned off.

SUMMARY OF THE INVENTION

It is an object of the present invention to provide a device for restricting flow of a fluid, in particular flow of water in a sanitary fitting, wherein a wide flow adjustment range can be realized in a simple manner.

This object is achieved by a device including a substantially cylindrical, hollow inlet body for the fluid and a substantially cylindrical outlet body for the fluid which is connected with the inlet body so as to be rotatable about a common longitudinal axis. The fluid is guided in longitudinal direction via a cross borehole and a following cavity, with the inlet body having a cut extending in longitudinal direction, said cut, together with the cross borehole in the outlet body forming a throttle valve. In a first relative radial position of the cross borehole and the cut, a maximum flow rate can be set, in a second radial position, a minimum flow rate can be set, and in intermediate positions thereof a defined flow rate can be set, from the opening of the inlet body to the exit of the outlet body.

In the device according to the invention, the flow rate can be adjusted between a minimum value and a maximum value as well as intermediate values by simply rotating the inlet body and the outlet body against each other. The radial position once set is then fixed by means of a clamping device. When the flow rate is to be changed, for example in a shower, the user only must change the radial position between the inlet body and the outlet body, without having to exchange elements. If the intermediate positions can be obtained without any steps the flow rate is steplessly variable.

In the present invention, the cavity in the outlet body leads into a mixing chamber having at least one lateral intake borehole from which a further fluid, preferably ambient air, from outside the outlet body can be supplied. In the mixing chamber, a further fluid is supplied to the first fluid to effect, for example, mixing and swirling of water and air, such that a relative large volume flow with reduced content of water is created. The intake borehole further serves for discharging water such that calcification is avoided and stagnant water is scarcely present, thereby strongly reducing microbial contamination.

Within the outlet body, a nozzle element in the form of an insert is disposed following the mixing chamber, said nozzle element being adjustable along the longitudinal axis of the outlet body and capable of immersing into the mixing chamber with the upper edge thereof. Through adjustment of the nozzle element along the longitudinal axis, efficiency of the mixing chamber in mixing the fluid with the further fluid is thus rendered adjustable. It is particularly advantageous if the nozzle element is in the form of a venture nozzle whereby a vacuum is created in the mixing chamber so as to take in further fluid, preferably ambient air, via the intake borehole.

One embodiment of the present invention is characterized in that the outlet body comprises a plug with the cross borehole, closed at one end thereof and projecting into the cut which is formed as an elongated hole. In the first radial position, the cross borehole is aligned with the longitudinal axis of the cut, and in the second redial position, the cross borehole is aligned with the transverse axis of the elongated hole. Cross borehole and elongated hole cooperate as throttle valve. Preferably, the elongated hole is constituted of three adjacently provided boreholes wherein the central borehole is only slightly larger than the diameter of the plug. When the cross borehole is aligned with the transverse axis of the elongated hole, the cross borehole is substantially sealed, and fluid does not pass via the cross borehole from the inlet body to the cavity of the outlet body.

For obtaining a minimum fluid flow rate, the front face of the plug can have an opening, e.g. a borehole, which supplies the cavity with fluid. Alternatively, the plug diameter can be reduced such that a space is created between the elongated hole and the cross borehole which allows fluid to flow into the cross borehole.

A further embodiment is characterized in that the clamping device is formed by a groove in the outlet body extending at least partly on the circumference thereof, and at least one lateral screw fixing the inlet body and the outlet body in the set radial position. Preferably, two lateral stud screws are used which are adapted to be screwed into the inlet body so as to be flush, at a 180° distance from each other, and which establish the fixed connection between the inlet body and the outlet body at the bottom of the groove. Loosening the laterals screws allows for detaching the outlet body from the inlet body and for cleaning thereof. Preferably, the groove extends about the complete circumference, such that the outlet body can assume any desired radial position. This is advantageous in order to allow for any desired positioning of the lateral intake borehole. The device discharges fluid contained therein through the above intake borehole, and the direction in which such discharge takes place is thus freely selectable.

According to a further advantageous embodiment, a spiral spring is disposed in the mixing chamber, pressing against the upper edge of the nozzle element and thereby fixing the set position of the nozzle element. In this simple manner, the position of the nozzle, and thus the mixing ratio of the mixing chamber is determined.

DETAILED DESCRIPTION OF THE INVENTION

Figure 1:
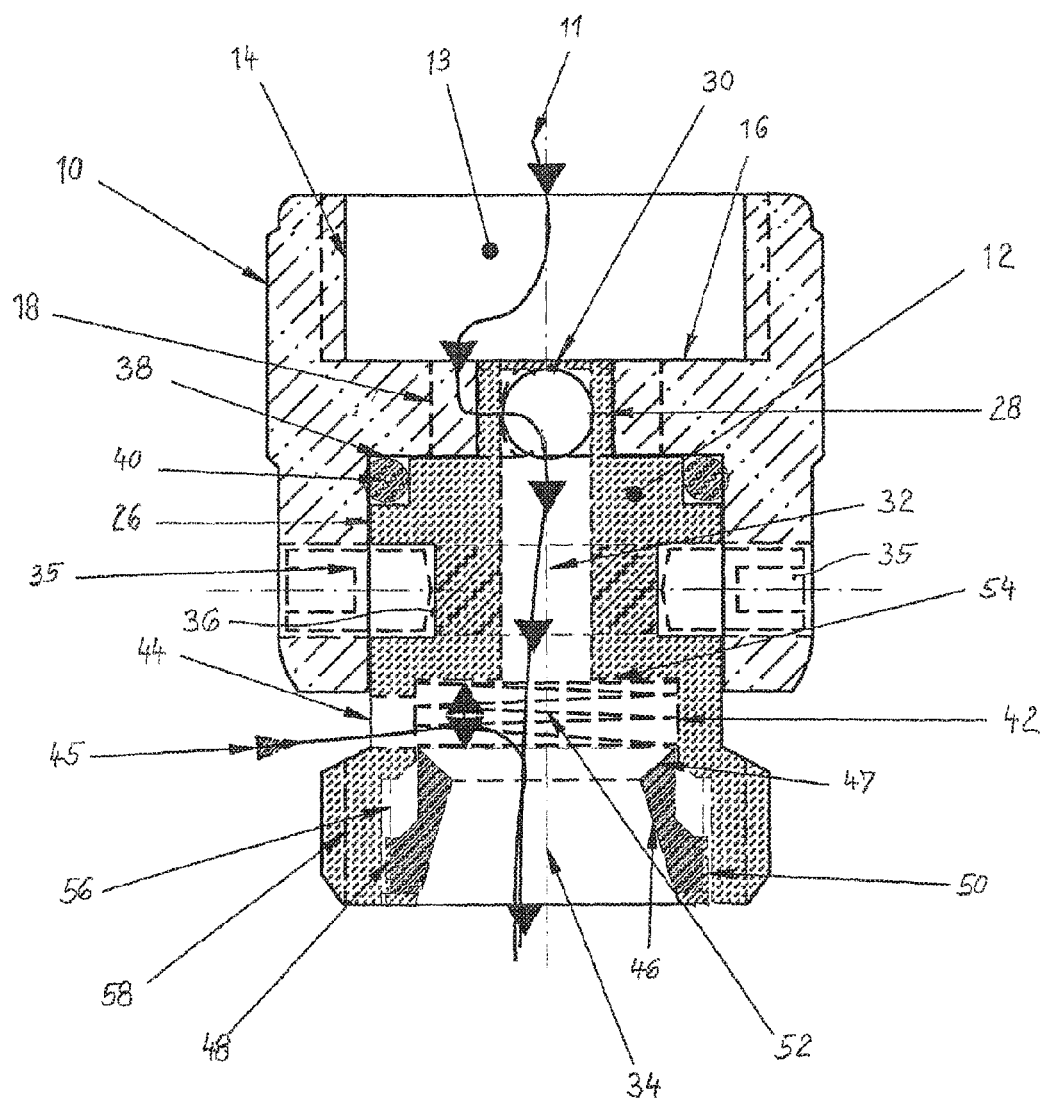
FIG. 1 is a sectional view of the assembled device, comprising an inlet body and an outlet body.

FIG. 1 shows a sectional view of a device for restricting the flow of water in a sanitary fitting. A device of this kind is, for example, used as a shower valve between a connecting pipe and a shower to restrict water flow.

The device comprises a cylindrical, hollow inlet body 10 and a substantially cylindrical outlet body 12 inserted therein. Both bodies 10, 12 are preferably realized as rotationally symmetrical rotatable parts made of metal.

The inlet body 10 for the fluid 11, water in this case, comprises an inflow space 13 which is limited by an internal thread 14 for connecting a water pipe in lateral direction, and in FIG. 1 is limited in downward direction by a stationary throttle valve 16 which is preferably integrally formed with the inlet body 10.

Figure 3:
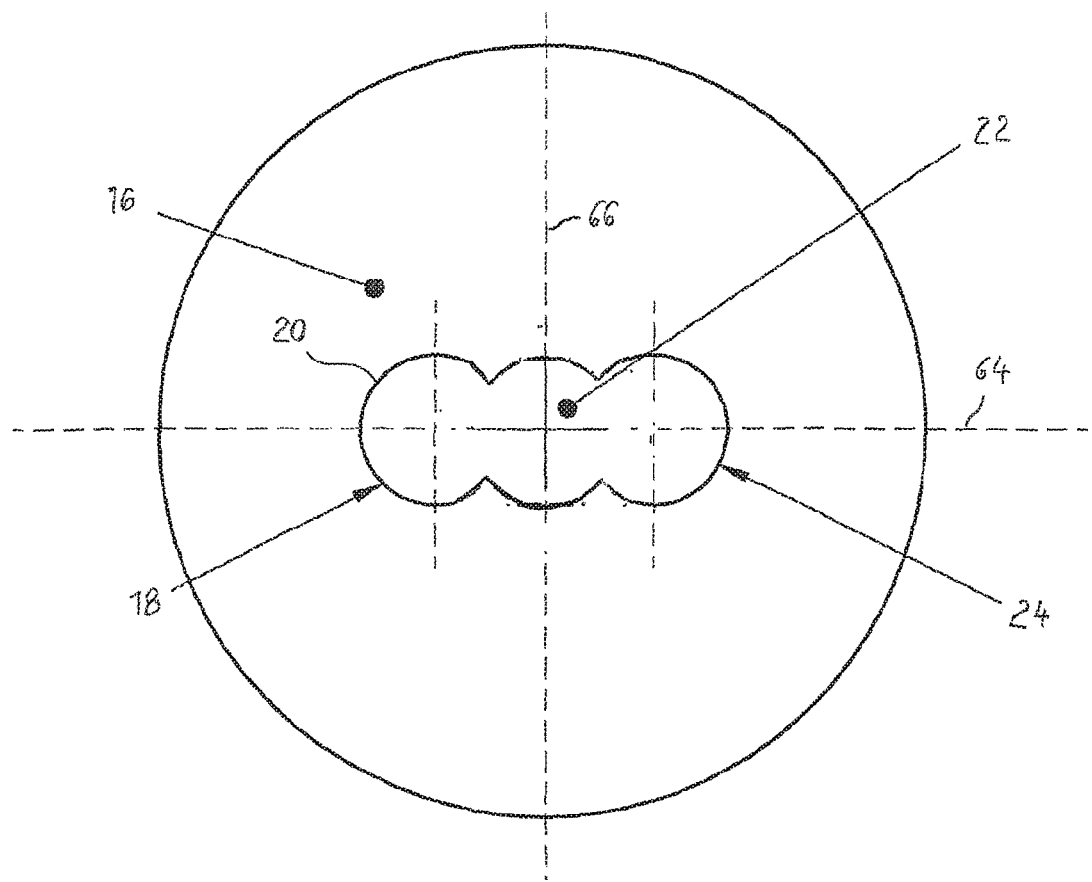
FIG. 3 is a plan view of the cut formed as an elongated hole.

FIG. 3 shows the throttle wall 16 in a plan view. The throttle wall 16 comprises an elongated hole 18 formed by three boreholes 20, 22, 24, as shown in FIG. 3. Details thereof are described later.

The inlet body 10 expands into a receiving space 26 where the rotationally symmetric outlet body 12 is received. The outlet body 12 has in the upper region thereof, shown in FIG. 1, a plug 28 projecting in the throttle wall 16 into the elongated hole 18. The plug 28 is upwardly closed and has a cross borehole 30 communicating with a cylindrical cavity 32 realized, e.g. as a blind hole. The elongated hole 18 and the cross borehole 30 in the plug 28 together serve as a throttle valve. In the second radial position shown, wherein the cross borehole 30 is perpendicular to the plane of the drawing sheet in FIG. 1, the throttle valve is closed and only minimum flow of fluid 11 is possible from the inflow space 13 to the cavity 32. The outlet body 12 is disposed in the inlet body 10 so as to be rotatable about a common axis 34. If the outlet body 12 is rotated by 90° with respect to FIG. 1 the cross borehole 30 is aligned with the longer axis of the elongated hole 18, and fluid 11 flows, at the maximum flow rate, from the inflow space 13 via the elongated hole 18 into the cross borehole 30, and into the cavity 32, as indicated by the arrows for the fluid 11. In intermediate positions, a defined flow rate for the flow of fluid 11 can be set, from the opening of the inlet body 10 to the exit of the outlet body 12.

A clamping device is provided for fixing the set relative radial position of the inlet body 10 and the outlet body 12. This clamping device is constituted by stud screws 35 which can be screwed into threads provided in the inlet body 10. The stud screws 35 engage a groove 36 provided so as to extend about 360° on the circumference of the outlet body 12, thus clamping the inlet body 10 and the outlet body 12 in the set radial position. This way, the outlet body 12 can be rotated about 360° and fixed in the inlet body 10.

In an alternative embodiment, the angle for the groove can be reduced which also reduces the adjustable rotation angle.

The outlet body 12 includes a circumferential recess 38 for receiving an O-ring 40, whereby the inlet body 10 and the outlet body 12 are mutually sealed in a fluid-tight manner via horizontal and vertical surface contact. Long durability of the sealing is thereby secured.

The cylindrical cavity 32 leads into a mixing chamber 42 of increased diameter which laterally has an intake borehole 44 from which a further fluid 45, ambient air in the present case, is supplied from outside the outlet body 12. This intake borehole 44 can also be used for discharging water that has remained in the device.

Following the mixing chamber 42, a rotational symmetric nozzle element 46 is arranged within the outlet body 12 as a variable insert, said nozzle element being adjustable along the axis 34 and capable of immersing into the depth of the mixing chamber 42 with the upper edge 47 thereof, shown in FIG. 1. For accomplishing the adjustment, the nozzle element 46 comprises a male thread 48 which is engaged with a female thread 50 provided in the exit region of the outlet body 12. Rotating the nozzle element 46 allows for adjustment of the penetration depth of the upper edge 47 into the mixing chamber, and thus of the mixing ratio of water and ambient air. A spiral spring 52 is disposed in the mixing chamber 42, said spiral spring resting against a stop 54 in the outlet body 12 on the one side, and against the upper edge 47 of the nozzle element 46 on the other side. The pressure thus applied fixes the set position of the nozzle element 46 with respect to the mixing chamber 42.

A clearance 56 is provided between the outlet body 12 and the nozzle element 46. The nozzle element 46 can be screwed into the depth of the mixing chamber 42 in accordance with said clearance 56. The maximum screwing depth is limited by the stop 54. When the maximum screwing depth is reached, admixture of air is no longer effected. This setting can be desirable, for example, in hospital application for reasons of hygienics in order to reduce the risk of germ formation due to particulate matter. Preferably, the nozzle element 46 is in the form of a venture nozzle so as to generate a vacuum in the mixing chamber for ambient air suctioning.

In the lower part of FIG. 1, the outlet body 12 has a male thread 58 for connecting a sanitary fitting, such as a pipe or a shower head.

Figure 2:
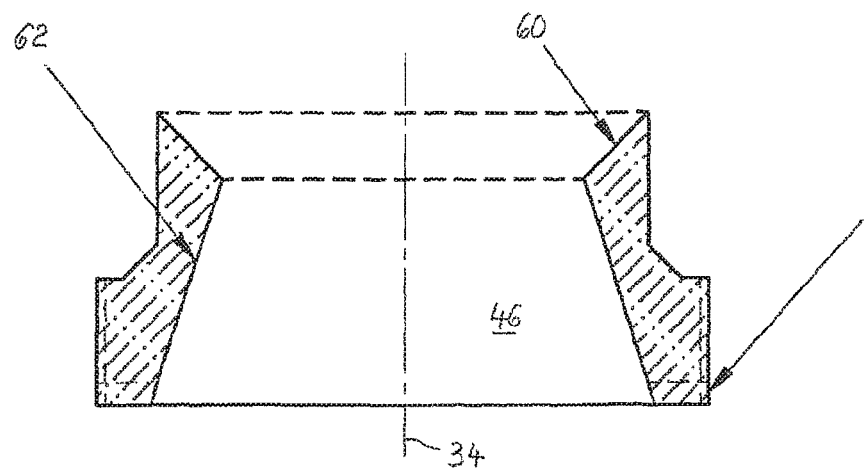
FIG. 2 is a sectional view of the nozzle element.

FIG. 2 is a cross-sectional view of the nozzle element 46 which is in the form of a venturi nozzle. In the storage area, there is an inclination 60 which then continues into the venturi cone 62.

FIG. 3 is a plan view of the throttle wall 16 comprising the elongated hole 18. The latter is formed by a central borehole 22 and two lateral boreholes 20 and 24 provided along a longitudinal axis 64. The central borehole 22 is slightly larger than the diameter of the plug 28. When the cross borehole 30 is aligned with the transverse axis 66 of the elongated hole 18 the valve constituted by the cross borehole 30 and the borehole 22 is closed. When the outlet body 12 is rotated such that the cross borehole 30 is aligned with the longitudinal axis 64 of the elongated hole 18 the throttle valve constituted by the elongated hole 18 and the cross borehole 30 is fully open, and maximum flow of fluid 11 takes place. In intermediate rotational positions, a defined flow rate of the fluid is adjustable, from the opening of the inlet body 10 to the exit of the outlet body 12.

Various modifications of the embodiment shown are possible. For example, the cross borehole 30 is not required to be cylindrical but may also have another, e.g. a rectangular, cross-sectional shape. To secure the minimum flow rate, the front face of the plug 28 can have an opening, e.g. a borehole. Alternatively, or additionally, the clearance between the plug 28 and the cut 18 can be enlarged.

Figure 4:
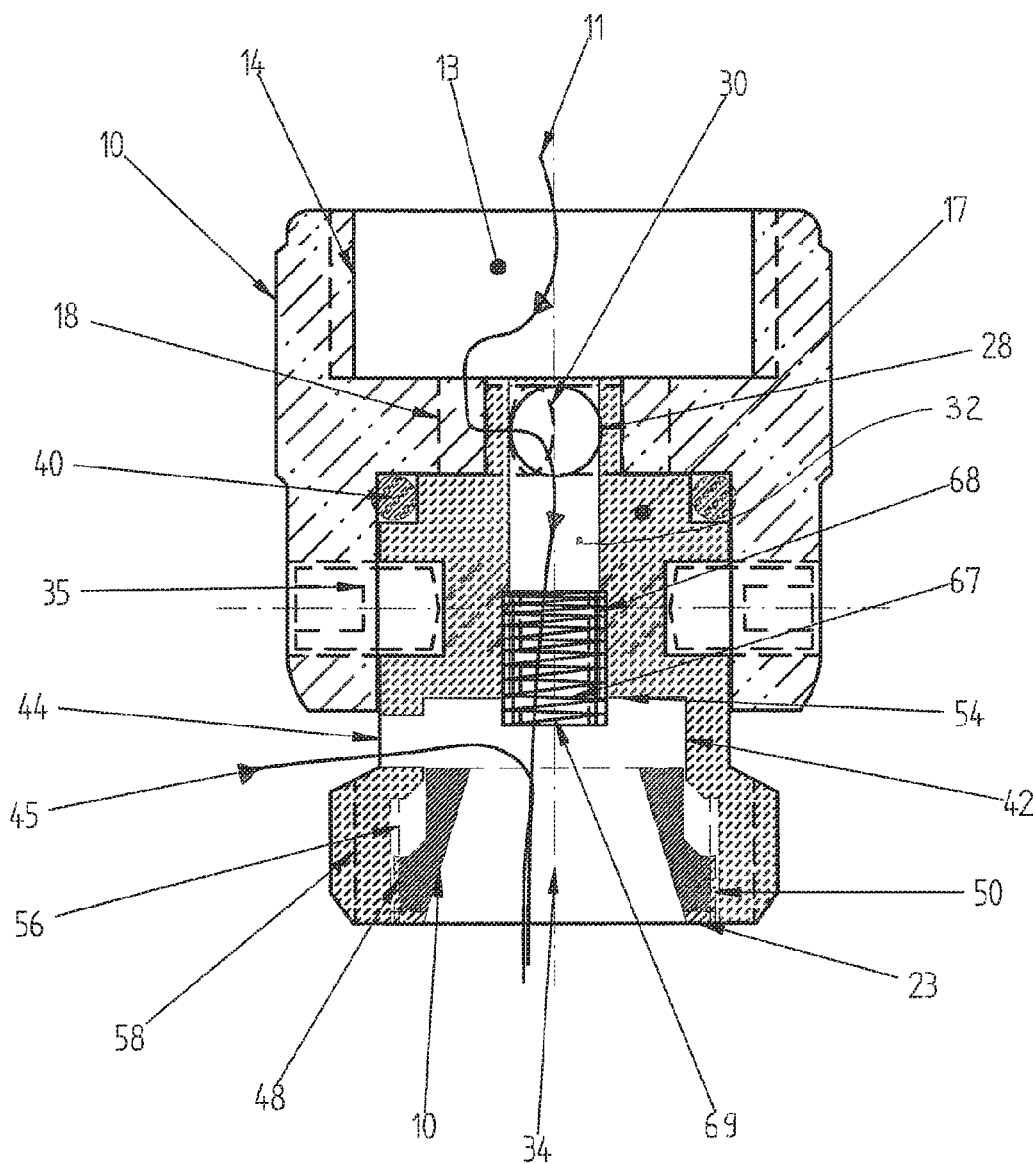
FIG. 4 is a modification of the embodiment according to FIG. 1.

FIG. 4 shows an important modification of the embodiment according to FIG. 1. Same parts are designated by same reference signs. According to FIG. 4, the borehole 32 includes a thread 68 into which a threaded pin 67 is insertable. Said threaded pin 67 has a longitudinal borehole 69 of a predetermined diameter. The threaded pin 67 having the longitudinal borehole 69 serves as exchangeable nozzle. Threaded pins 67 with different diameters of the longitudinal borehole 69 allow for variable adjustment of the maximum flow rate. Furthermore, the cavity of the borehole 32 can be maintained at a maximum cross section so as to regulate a relative large water flow, e.g. of 12 to 16 l/min, even for rain showers, for example. The modification shown in FIG. 4 largely extends the application range of the device.

The described device for restricting the flow of a fluid can be employed in private households and in commercial applications. The device has a simple structure, and consists of two main bodies with O-ring and two stud screws, a nozzle element and a spring for locking the nozzle element. The flow rate of the fluid, preferably water, is steplessly variable. Also intake of a further fluid, mainly ambient air, is adjustable via the nozzle element. Likewise, the mixing ratio of ambient air and water is adjustable. Draining a feed hose and a fitting element, for example a shower head, can be effected in a simple manner via the intake borehole for ambient air.

LIST OF REFERENCE SIGNS 10 inlet body
11 fluid
12 outlet body
13 inflow space
14 female thread
16 throttle wall
18 elongated hole
20, 22, 24 boreholes
26 receiving space
28 plug
30 cross borehole
32 cavity
34 longitudinal axis
35 stud screws
36 groove
38 recess
40 O-ring
42 mixing chamber
44 intake borehole
45 further fluid
46 nozzle element
47 upper edge of nozzle element
48 male thread
50 female thread
52 spiral spring
54 stop
56 clearance
58 male thread
62 venturi cone
64 longitudinal axis
66 transverse axis
67 threaded pin
68 thread
68 longitudinal borehole

The invention claimed is:

1. A device for restricting flow of a fluid; comprising:
having a substantially cylindrical, hollow inlet body for the fluid;
a substantially cylindrical outlet body for the fluid, which is connected to the inlet body so as to be rotatable about a common longitudinal axis, and conducts the fluid via a cross borehole and a downstream cavity in a direction of the longitudinal axis, wherein the inlet body has an elongated hole extending in the direction of the longitudinal axis, said elongated hole forming a throttle valve in cooperation with the cross borehole provided in the outlet body,
wherein a maximum flow rate is settable in a first relative radial position of the cross borehole and the elongated hole, a minimum flow rate is settable in a second radial position, and a defined flow rate is settable in intermediate positions, for a flow of fluid from an opening of the inlet body to an exit of the outlet body,
wherein the cavity in the outlet body leads into a mixing chamber including at least one lateral intake borehole from which a further fluid is supplyable from outside the outlet body;
a nozzle element arranged within the outlet body downstream of the mixing chamber, said nozzle element being adjustable along the longitudinal axis of the outlet body and being capable of penetrating into the mixing chamber with an upper edge thereof; and
a clamping device for fixing the set radial position of the inlet body and the outlet body relative to each other.

2. The device according to claim 1, wherein the outlet body comprises a plug having a cross borehole and projecting into the elongated hole, wherein the cross borehole is aligned with a longitudinal axis of the elongated hole in the first radial position, and is aligned with a transverse axis of the elongated hole in the second position.

3. The device according to claim 1, wherein the clamping device is formed by a groove extending circumferentially on the outlet body and at least one lateral screw that fixes the inlet body and the outlet body in the set radial position.

4. The device according to claim 3, wherein the groove extends about an entire circumference of the outlet body.

5. The device according to claim 1, the nozzle element is a venturi nozzle.

6. The device according to claim 1, wherein the nozzle element comprises a male thread engaged with a female thread of the outlet body, a penetration depth of the upper edge into the mixing chamber, and thus a mixing ratio of the fluid with the further fluid is adjustable by rotation of the nozzle element.

7. The device according to claim 6, wherein the further fluid is ambient air.

8. The device according to claim 1, further comprising a spiral spring disposed in the mixing chamber, said spiral spring pressing against the upper edge of the nozzle element and fixing the set position of the nozzle element.

9. The device according to claim 1, wherein the inlet body is sealed with respect to the outlet body by an O-ring.

10. The device according to claim 2, wherein a front face of the plug has an opening connected to the cross borehole to secure a minimum flow of fluid in the second position.

11. The device according to claim 2, wherein a clearance is present between the plug and the elongated hole to secure a minimum flow of fluid in the second position.

12. The device according to claim 1, wherein the cavity comprises a thread, a threaded pin with a longitudinal bore being arranged in the cavity, wherein the threaded pin acts as an exchangeable nozzle for restricting the flow.

* * * * *